(12) United States Patent
Miyagawa et al.

(10) Patent No.: US 7,472,944 B2
(45) Date of Patent: Jan. 6, 2009

(54) VEHICLE SLIDING DOOR OPENING AND CLOSING APPARATUS

(75) Inventors: Masazumi Miyagawa, Yamanashi (JP); Shigenori Hiramoto, Yamanashi (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 388 days.

(21) Appl. No.: 11/275,926

(22) Filed: Feb. 3, 2006

(65) Prior Publication Data

US 2006/0202507 A1 Sep. 14, 2006

(30) Foreign Application Priority Data

Feb. 4, 2005 (JP) ............... 2005-028416

(51) Int. Cl.
*B60J 5/06* (2006.01)
(52) U.S. Cl. ..................................... 296/155
(58) Field of Classification Search ............. 296/155, 296/146.1, 146.2; 49/280, 360; 318/55, 318/446, 266, 280
See application file for complete search history.

(56) References Cited

U.S. PATENT DOCUMENTS

| | | | | |
|---|---|---|---|---|
| 5,525,875 A | * | 6/1996 | Nakamura et al. | 318/266 |
| 6,134,837 A | * | 10/2000 | Kawanobe et al. | 49/360 |
| 6,398,288 B1 | * | 6/2002 | Yuge | 296/146.4 |
| 6,729,071 B1 | * | 5/2004 | Kawanobe et al. | 49/360 |
| 6,955,389 B2 | * | 10/2005 | Suzuki et al. | 296/146.4 |
| 7,003,915 B2 | * | 2/2006 | Yokomori | 49/360 |
| 7,178,854 B2 | * | 2/2007 | Ichinose et al. | 296/146.2 |
| 7,210,731 B2 | * | 5/2007 | Ichinose et al. | 296/155 |
| 7,288,907 B2 | * | 10/2007 | Kamiya et al. | 318/266 |
| 2001/0033086 A1 | * | 10/2001 | Yuge et al. | 296/56 |
| 2004/0256883 A1 | * | 12/2004 | Ichinose et al. | 296/155 |
| 2004/0262945 A1 | * | 12/2004 | Suzuki et al. | 296/155 |
| 2005/0001444 A1 | * | 1/2005 | Sakai et al. | 296/56 |
| 2005/0001568 A1 | * | 1/2005 | Yokomori | 318/55 |
| 2005/0039405 A1 | * | 2/2005 | Yokomori | 49/360 |
| 2006/0137136 A1 | * | 6/2006 | Imai et al. | 16/52 |
| 2006/0168891 A1 | * | 8/2006 | Aoyama et al. | 49/360 |
| 2006/0175865 A1 | * | 8/2006 | Ichinose et al. | 296/146.2 |
| 2006/0175868 A1 | * | 8/2006 | Ichinose et al. | 296/155 |

FOREIGN PATENT DOCUMENTS

| JP | 61-152682 | 9/1986 |
|---|---|---|
| JP | 2002-276227 | 9/2002 |

* cited by examiner

*Primary Examiner*—H Gutman
(74) *Attorney, Agent, or Firm*—Foley & Lardner LLP

(57) ABSTRACT

A drive unit which operates in a first direction based on operation of a door opening and closing control unit so as to unfasten a latch of a full-opening latch unit is connected to a half-opening stopping unit being displaced from a state where the half-opening stopping unit is made unable to abut with a half-opening striker provided on a vehicle body side to a state where the half-opening stopping unit is made abut with the halt-opening striker when a window glass provided in a sliding door, so as to abut with the half-opening striker when the sliding door is opened to a predetermined half-opened position to thereby stop the sliding door at the half-opened position in such a manner that the half-opening stopping unit is displaced to the state where the half-opening stopping unit abuts with the half-opening striker when the drive unit is operated in a second direction.

17 Claims, 6 Drawing Sheets

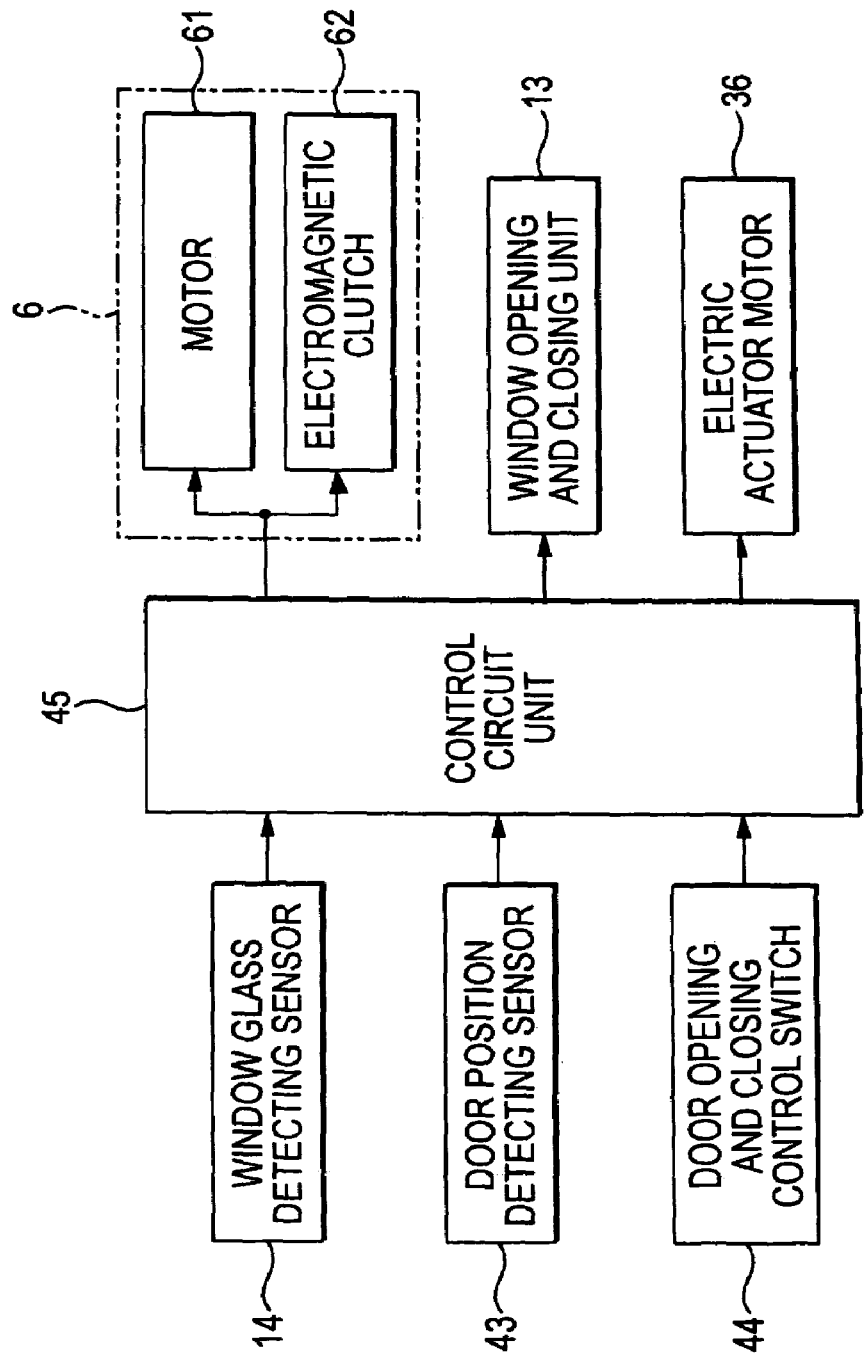

VEHICLE SLIDING DOOR OPENING AND CLOSING APPARATUS

This application is based on Japanese Patent Application No. 2005-028416, which is incorporated herein by reference.

BACKGROUND OF THE INVENTION

1. Field of the Invention

The present invention relates to a vehicle sliding door opening and closing apparatus which enables the opening and closing of a sliding door based on the control of a door opening and closing control unit.

2. Description of the Related Art

A related vehicle sliding door opening and closing apparatus is configured such that a door opening and closing drive unit is caused to operate based on an opening operation instructed by a door opening and closing control switch so as to move the sliding door in an opening direction, and when the sliding door reaches a fully opened position, a full-opening latch unit provided on the sliding door is brought into engagement with a full-opening striker on the side of a vehicle body, whereby the sliding door is held at the fully-opened position, while, when the sliding door is hold at the fully-opened position, a drive unit having an electric motor is caused to operate so as to unfasten a latch of the full-opening latch unit before the door opening and closing drive unit is caused to operate based on a closing operation instructed by the door opening and closing control switch, and thereafter, the sliding door is caused to move in a closing direction (refer, for example, to JP-A-2002-276227).

In addition, there have been proposed various types of half-opening stopping devices for stopping the sliding door at a predetermined half-opened position when the sliding door has reached the half-opened position in the event that a window glass provided in the sliding door in such a manner as to be opened and closed is in an opened state in order to avoid a risk that an object is trapped between part of a window opening and part of a door opening (refer, for example, to JP-UM-A-61-152682). In these half-opening stopping devices, when a window glass detecting sensor for detecting the opening and closing of the window glass detects that the window glass has been opened, a stopper member is caused to project into a moving locus of the sliding door by a drive unit (a solenoid) provided on the side of a vehicle body, whereby when the sliding door is opened to the predetermined half-opened position, the sliding door is brought into abutment with the stopper member so as to stop the sliding door at the half-opened position.

When the half-opening stopping device is applied to the door opening and closing apparatus, however, two drive units, one for unfastening the latch of the full-opening latch unit and the other for enabling the sliding door to be stopped at the half-opened position when the window glass is opened, are necessary, and therefore, since an increase in cost is called for, this is not economical.

SUMMARY OF THE INVENTION

The invention was made in view of the problem inherent in the related art and an object thereof is to provide a vehicle sliding door opening and closing apparatus which enables the operation of both the full-opening latch unit and the half-opening stopping unit with a single drive unit so as to reduce the costs involved in this area.

According to the invention, the problem is to be solved as follows.

(1) According to a first aspect of the invention, there is provided a vehicle sliding door opening and closing apparatus which enables the opening and closing of a sliding door that is supported in such a manner as to be opened and closed along a vehicle body based on operation of a door opening and closing control unit, comprising a full-opening latch unit adapted to be brought into engagement with a full-opening striker provided on the side of the vehicle body so as to hold the sliding door at a fully-opened position, a drive unit adapted to operate in a first direction based on operation of the door opening and closing control unit so as to unfasten a latch of the full-opening latch unit, a half-opening stopping unit adapted to be displaced from a state where the half-opening stopping unit is made unable to be brought into abutment with a half-opening striker provided on the side of the vehicle body to a state where the half-opening stopping unit is made able to be brought into abutment with the half-opening striker when a window glass provided in the sliding door in such a manner as to be opened and closed is opened, so as to be brought into abutment with the half-opening striker when the sliding door is opened to a predetermined half-opened position to thereby stop the sliding door at the half-opened position, a window glass detecting switch adapted to detect the opening and closing of the window glass, and a control unit adapted to control the drive unit so as to operate in a second direction when the window glass detecting switch detects that the window glass has been opened, wherein the drive unit is linked to the half-opening stopping unit in such a manner that the half-opening stopping unit can be displaced to the state where the half-opening stopping unit is brought into abutment with the half-opening striker when the drive unit is operated in the second direction.

(2) According to a second aspect of the invention, there is provided a vehicle sliding door opening and closing apparatus which enables the opening and closing of a sliding door that is supported in such a manner as to be opened and closed along a vehicle body based on operation of a door opening and closing control unit, comprising a door opening and closing drive unit adapted to operate based on operation of the door opening and closing control unit so as to move the sliding door to be opened and closed, a full-opening latch unit adapted to be brought into engagement with a full-opening striker provided on the side of the vehicle body so as to hold the sliding door at a fully-opened position, a drive unit adapted to operate in a first direction based on operation of the door opening and closing control unit so as to unfasten a latch of the full-opening latch unit, a half-opening stopping unit adapted to be displaced from a state where the half-opening stopping unit is made unable to be brought into abutment with a half-opening striker provided on the side of the vehicle body to a state where the half-opening stopping unit is made able to be brought into abutment with the half-opening striker when a window glass provided in the sliding door in such a manner as to be opened and closed is opened, so as to be brought into abutment with the half-opening striker when the sliding door is opened to a predetermined half-opened position to thereby stop the sliding door at the half-opened position, a window glass detecting switch adapted to detect the opening and closing of the window glass, and a control unit adapted to control the drive unit so as to operate in a second direction when the window glass detecting switch detects that the window glass has been opened, wherein the drive-unit is linked to the half-opening stopping unit in such a manner that the half-opening stopping unit can be displaced to the state where the half-opening stopping unit is brought into abutment with the half-opening striker when the drive-unit is operated in the second direction.

(3) According to a third aspect of the invention, there is provided a vehicle sliding door opening and closing apparatus as set forth under (1) or (2) above, wherein the half-opening stopping unit has a half-opening stopper member which can move between a sunk position where the half-opening stopping unit is unable to be brought into abutment with the half-opening striker and a projecting position where the half-opening stopping unit is able to be brought into abutment with the half-opening striker, a pawl member which holds the half-opening stopper member at the projecting position by being brought into engagement with the half-opening stopper and enables the half-opening stopper to move to the sunk position by being disengaged therefrom and a spring which biases the half-opening stopper member to the sunk position, and wherein the half-opening stopper member moves from the sunk position to the projecting position against a biasing force of the spring when the drive unit operates in the second direction.

(4) According to a fourth aspect of the invention, there is provided a vehicle sliding door opening and closing apparatus as set forth under any of (1) to (3) above, wherein the pawl member of the half-opening stopping unit disengages from the half-opening stopper member in synchronism with the unfastening of the latch of the full-opening latch units which occurs when the drive unit operates in the first direction.

(5) According to a fifth aspect of the inventions there is provided a vehicle sliding door opening and closing apparatus as set forth in any of (1) to (4) above, wherein the control unit is able to measure the position of the sliding door based on the movement of the sliding door and, when measuring a fully-closed position of the sliding door and a position between the fully-closed position and the half-closed position thereof, controls such that the drive unit operates in the first direction in the event that the window glass detecting switch detects that the window glass has been closed.

(6) According to a sixth aspect of the invention, there is provided a vehicle sliding door opening and closing apparatus as set forth under any of (1) to (5) above, wherein when measuring the fully-opened position of the sliding door and a position between the fully-opened position and the half-opened position thereof, the control unit controls such that the drive unit does not operate even in the event that the window glass detecting switch detects that the window glass has been opened.

(7) According to a seventh aspect of the invention, there is provided a vehicle sliding door opening and closing apparatus as set forth under (2) above, wherein the door opening and closing drive unit has a motor which is able to operate based on control of the door opening and closing control unit and an electromagnetic clutch which is able to connect and disconnect an operation force transmission path which connects the motor and the sliding door together, and wherein the control unit controls such that the electromagnetic clutch is put in a connecting state so as to impart a braking force to the sliding door in the event that the control unit measures the movement of the sliding door in a closing direction immediately after the sliding door has stopped at the half-opened position.

According to the invention, there are provided the following advantages.

(a) According to the first aspect of the invention, since both the full-opening latch unit and the half-opening stopping unit can be operated with the single drive unit while obviating the necessity of addition of another drive unit for operating the half-opening stopping unit by linking the drive unit to the half-opening stopping unit in such a manner that the half-opening stopping unit can be displaced to the state where the half-opening stopping unit is brought into abutment with the half-opening striker when the drive unit is operated in the second direction, a reduction in costs can be realized.

(b) According to the second aspect of the invention, in addition to the advantage provided by the first aspect of the invention, compatibility between convenience and safety can be realized by utilizing the door opening and closing drive unit.

(c) According to the third aspect of the invention, the half-opening stopping unit has the half-opening stopper member which can move between the sunk position where the half-opening stopping unit is unable to be brought into abutment with the half-opening striker and the projecting position where the half-opening stopping unit is able to be brought into abutment with the half-opening striker, the pawl member which holds the half-opening stopper member at the projecting position by being brought into engagement with the half-opening stopper and enables the half-opening stopper to move to the sunk position by being disengaged therefrom and the spring which biases the half-opening stopper member to the sunk position, and the half-opening stopper member can move from the sunk position to the projecting position against the biasing force of the spring when the drive unit operates in the second direction, whereby the half-opening stopping unit can be moved to the sunk position and the projecting position to be held at the respective positions in a simple and ensured fashion.

(d) According to the fourth aspect of the invention, the pawl member of the half-opening stopping unit disengages from the half-opening stopper member in synchronism with the unfastening of the latch of the full-opening latch units which occurs when the drive unit operates in the first direction, whereby the latch of the full-opening latch unit can be unfastened by virtue of the operation of the drive unit in the second direction, and the half-opening stopper member can be moved from the projecting position to the sunk position.

(e) According to the fifth aspect of the invention, when the sliding door lies between the fully-closed position and the half-opened position, by closing the window glass that had once been opened, the half-opening stopper member can be moved to the sunk position by the drive unit, and the sliding door can be moved to a position which has passed the half-opened position.

(f) According to the sixth aspect of the invention, since there is no need to move the half-opening stopper member to the projecting position in an area between the half-opened position and the fully-opened position where there exists no risk that an object is trapped, an unnecessary movement of the half-opening stopper member can be eliminated. In addition, since the half-opening stopper member is brought into abutment with the half-opening striker in no case when the sliding door is closed, the sliding door can be closed smoothly.

(g) According to the seventh aspect of the invention, it is possible to prevent the abrupt closing of the sliding door that would occur by gravity immediately after the sliding door has stopped at the half-opened position when the vehicle is stopped on a slope which inclines downwardly to the front thereof.

BRIEF DESCRIPTION OF THE DRAWINGS

FIG. 8 is a block diagram of a control circuit.

DETAILED DESCRIPTION OF THE PREFERRED EMBODIMENTS

Figure 1:
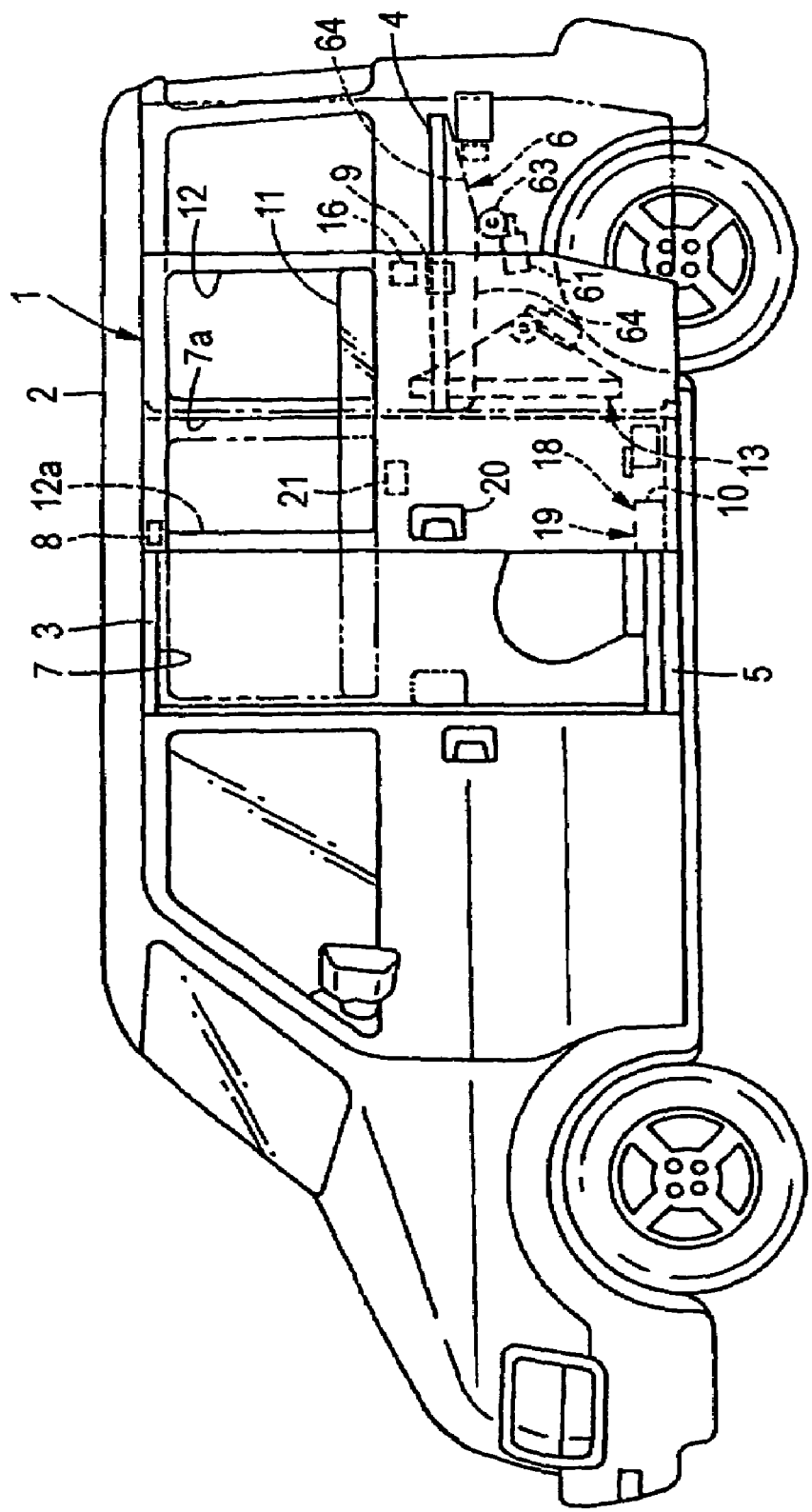
FIG. 1 is a side view of a vehicle to which the invention is applied.
Figure 2:
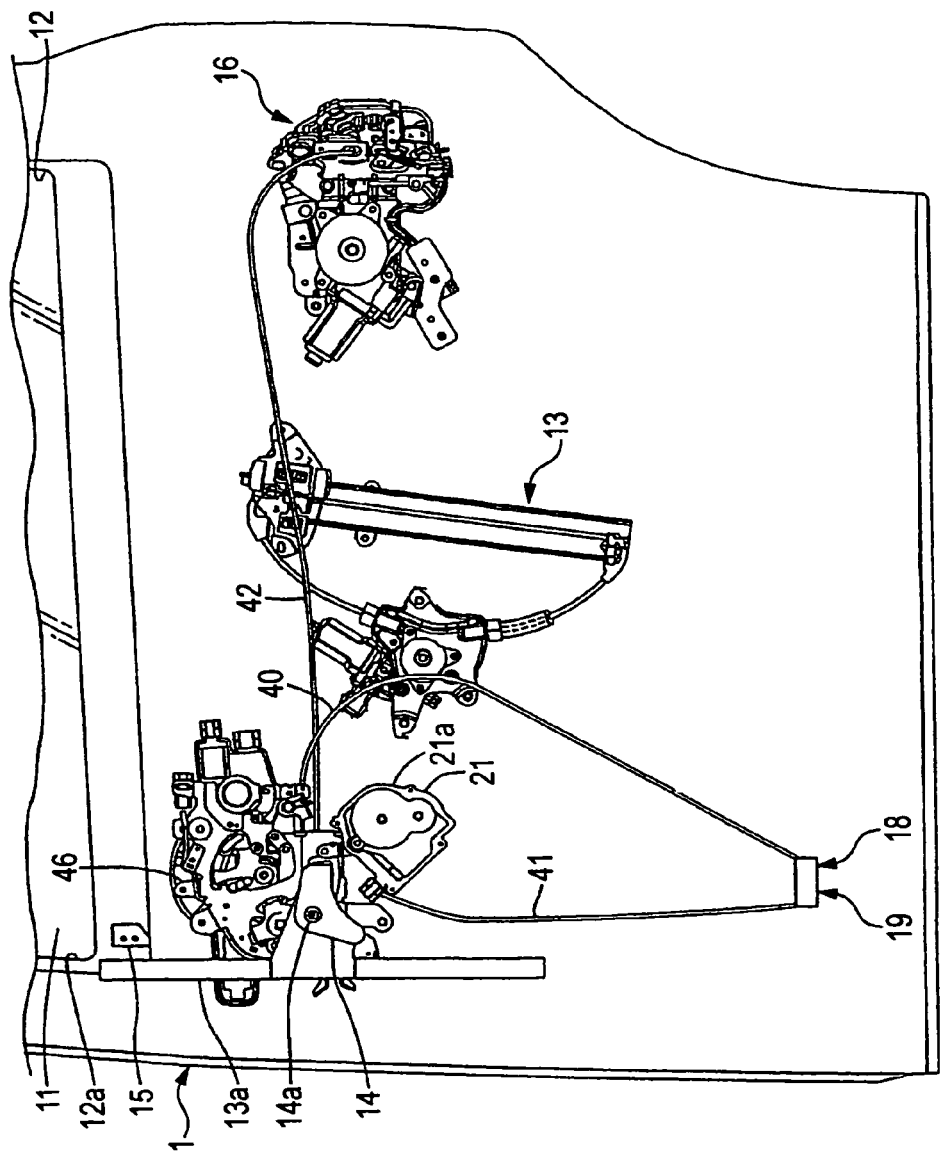
FIG. 2 is a side view which shows an internal structure of a sliding door.

Hereinafter, an embodiment of the invention will be described based on the accompanying drawings. FIG. 1 is a side view of a vehicle to which the invention is applied, and FIG. 2 is a side view which shows an internal structure of a sliding door. Note that in the following description, the left in FIGS. 1 and 2 denotes the front of the vehicle, whereas the right in FIGS. 1 and 2 denotes the rear of the vehicle.

A sliding door (1) of a vehicle is fixed to a side of a vehicle body (2) and is supported in such a manner as to move in a longitudinal direction along the side of the vehicle body (2) by upper, middle and lower longitudinally extending guide rails (3), (4), (5), so as to move manually or via a door opening and closing drive unit (6), which will be described later on, from a fully-closed position where the sliding door (1) closes a door opening (7) provided in the side of the vehicle body (2) to a fully-opened position which the sliding door (1) reaches when it has moved to its rearmost position along the vehicle body (2) while being moved slightly outboard from the side of the vehicle body (2) and vice versa. Note that guide rollers (8), (9), (10) are provided on the sliding door (1) at locations thereon which correspond to the respective guide rails (3), (4), (5) in such a manner as to fit in the guide rails (3), (4), (5) respectively, to roll therein.

A window opening (12), which is to be opened and closed by a vertically movable window glass (11), is provided in an upper half part of the sliding door (1). The window glass (11) is adapted to be opened and closed by operating an electric window opening and closing device (13) accommodated within the sliding door (1) based on control of a control switch (not shown) provided in a passenger compartment.

A window glass detecting sensor (14), which can detect opened and closed states of the window glass (11), is pivotally supported by a pivot shaft (14a) at the rear of a front sash (13a) of the window opening (12) which guides the window glass (11) in a vertical direction.

The window glass detecting sensor (14) is held as shown in FIG. 2 to thereby be electrically switched off and sends out a window glass closed signal when the window glass (11) is at a closed position, whereas when the window glass (11) descends to a predetermined position to thereby be in an opened state, the window glass detecting sensor (14) comes into abutment with a detecting member (15) fixed to a lower portion of the window glass (11) and rotates in a counter-clockwise direction in FIG. 2 by a predetermined amount to thereby be electrically switched on, sending out a window glass opened signal, The door opening and closing drive unit (6) is accommodated within the vehicle body (2) and includes a motor (61) which can rotate forwards and backwards, a rotary drum (63) which can rotate forwards and backwards via a reduction gear (not shown) which reduces the rotational speed of the motor (61), a cable (64) which is wound around the rotary drum (63) in such a manner as to be taken up and fed out thereby, laid out along the middle guide rail (4) and is connected to a central portion of a rear end of the sliding door (1), and an electromagnetic clutch (62) (refer to FIG. 8) which is provided between the motor (61) and the sliding door (1) or, to be specific, on an operation force transmission path between an output side of the reduction gear and the rotary drum (63) so as to connect and disconnect the operation force transmission path, whereby when the electromagnetic clutch (62) connects the operation force transmission path based on control of a door opening and closing control switch (44) which constitutes a door opening and closing control unit provided near a driver's seat or any other location and the motor (61) rotates forwards or backwards, the sliding door (1) can be moved in an opening direction or a closing direction.

Note that when the electromagnetic clutch (62) disconnects the operation force transmission path, the sliding door (1) can freely be opened and closed in a manual fashion. In addition, when the electromagnetic clutch (62) connects the operation force transmission path and the motor (61) is stopped rotating, the sliding door (1) can be stopped to be held at a desired position by virtue of a braking force of the reduction gear.

A full-closing latch unit (16) is provided at a rear end portion within the sliding door (1) which is adapted to be brought into engagement with and disengagement from a striker (not shown) secured to an appropriate location on an opening rear edge (7a) of the door opening (7). This full-closing latch unit (16) holds the sliding door (1) at a fully-closed position by being brought into engagement with the striker, whereas the full-closing latch unit (16) enables the sliding door (1) to move in an opening direction by being brought into disengagement from the striker, The unfastening of a latch of the full-closing latch unit (16) is implemented by operating an external operating handle (20) and an internal operating handle (not shown) which constitute the door opening and closing control unit provided on the sliding door (1) and by means of an electric actuator (21) which constitutes a drive unit provided within the sliding door (1).

Provided at a front lower end portion (for example, the lower guide rail (5)) of the siding door (1) are a full-opening latch unit (18) which can hold the sliding door (1) at the fully-opened position by being brought into engagement with a full-opening striker (17) (refer to FIG. 3) provided at a rear end portion of the lower guide rail (5) and a half-opening stopping unit (19) which can stop the sliding door (1) at a predetermined half-opened position (a position indicated by solid lines in FIG. 1) when the sliding door (1) is opened to the half-opened position by being brought into abutment with a half-opening striker (33) (refer to Fig. 3) provided substantially at a longitudinal central portion of the guide rail (5) in the event that the window glass (11) is in the opened state.

Figure 3:
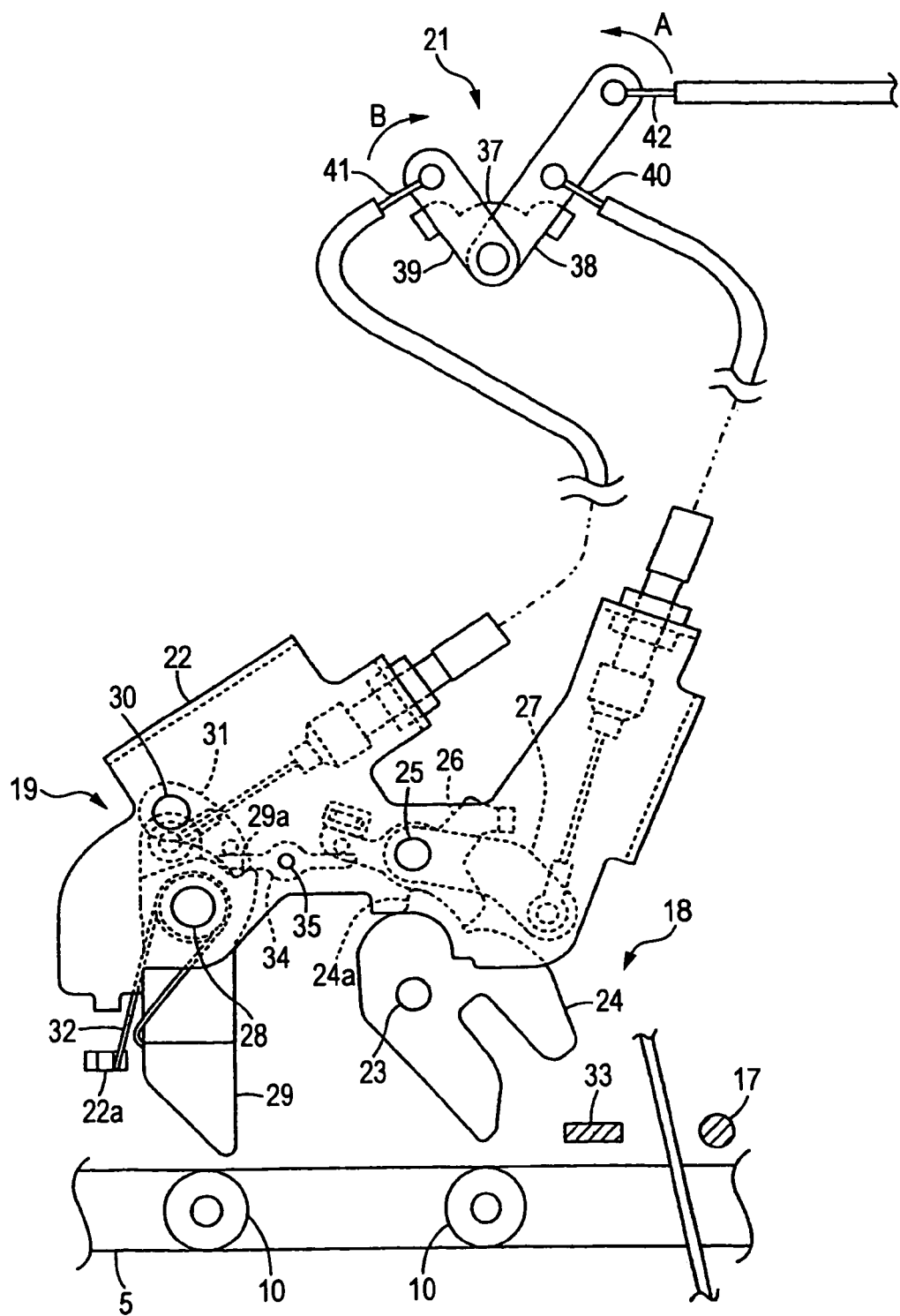
FIG. 3 is a plan view which shows a full-opening latch unit, a half-opening stopping unit and the vicinity thereof.

FIG. 3 is a plan view which shows the full-opening latch unit (18), the half-opening stopping unit (19) and the vicinity thereof, and FIGS. 4 to 7 are operation explanatory diagrams of the full-opening latch unit (18) and the half-opening stopping unit (19).

The full-opening latch unit (18) has a base plate (22) which is fixed to the sliding door (1), a latch (24) which is pivotally secured to the base plate (22) by a pivot shaft (23) which extends vertically and is adapted to be brought into engagement with and disengagement from the full-opening striker (17), a pawl member (26) which is pivotally secured to the base plate (22) by a pivot shaft (25) which is oriented or extends vertically and a link lever (27) which is secured to the base plate (22) in such a manner as to pivot concentrically with the pawl member (26). Note that the latch (24) is biased by a spring (not shown) in an opening direction (in a counterclockwise direction in FIGS. 3 to 7), while the pawl member (26) is biased by a spring (not shown) in an engaging direction (a clockwise direction). In addition, the latch (24) is provided at such a height that it does not interfere with the half-opening striker (33).

Figure 5:
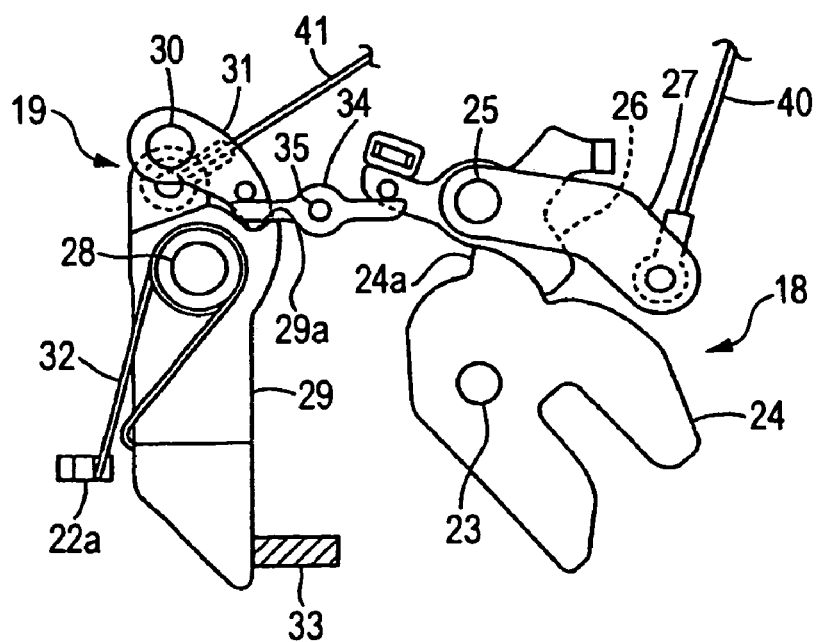
FIG. 5 is an operation explanatory diagram of the full-opening latch unit and the half-opening latch unit.
Figure 6:
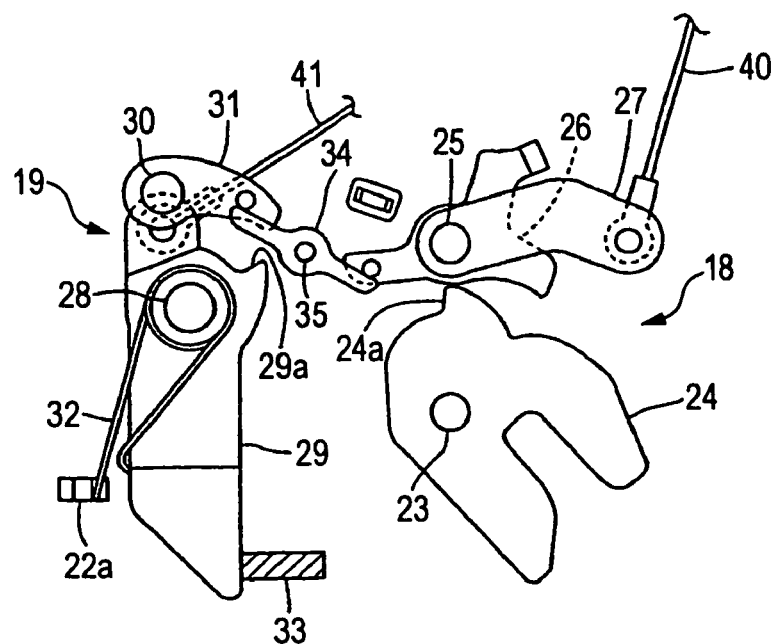
FIG. 6 is an operation explanatory diagram of the full-opening latch unit and the half-opening latch unit.
Figure 7:
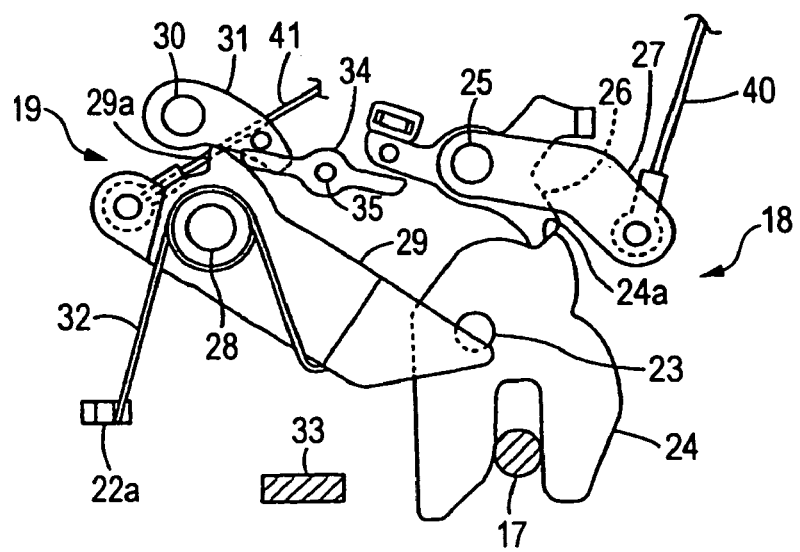
FIG. 7 is an operation explanatory diagram of the full-opening latch unit and the half-opening latch unit.

The latch (24) is able to rotate between a latching position where the latch (24) is, as shown in FIG. 7, brought into engagement with the full-opening striker (17) when the sliding door (1) is fully opened and an unlatching position where the latch (24) rotates, as shown in FIGS. 3 to 6, by a predetermined amount from the latching position towards the opening direction so as to be brought into disengagement from the full-opening striker (17).

The link lever (27) is linked to the operating handle (20), which will be described later on, and the electric actuator (21) which constitutes the drive unit so as to rotate front a waiting position shown in FIGS. 3 to 5 and 7 to an operable position shown in FIG. 6.

The pawl member (26) is able to rotate between an engaging position where the pawl member (26) is, as shown in FIG. 7, brought into engagement with a step portion (24a) provided on an outer circumference of the latch (24) and a releasing position where the pawl member (26) is, as shown in FIG. 6, brought into disengagement from the step portion (24a).

The half-opening stopping unit (19) has a half-opening stopper member (29) which is pivotally secured to the base plate (22) by a pivot shaft (28) which extends vertically, a pawl member (31) which is pivotally secured by a pivot shaft (30) which extends vertically, and a spring (32) which biases the half-opening stopper member (29) in a sinking direction (a clockwise direction in FIGS. 3, 5 and 6).

Figure 4:
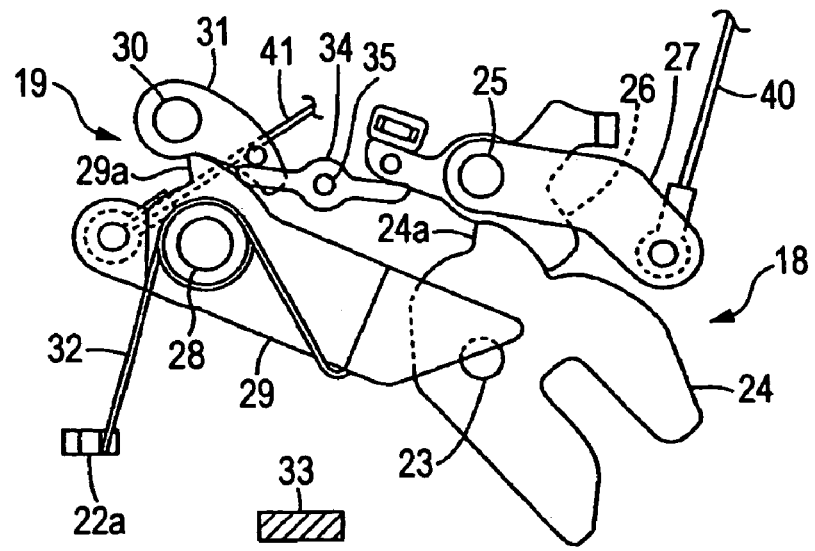
FIG. 4 is an operation explanatory diagram of the full-opening latch unit and the half-opening latch unit.

The half-opening stopper member (29) is able to rotate between a sunk position where the half-opening member (29) sinks, as shown in FIGS. 4, 7, into the base plate (22) so as not to be brought into abutment with the half-opening striker (33) and a projecting position where the half-opening stopper member (29) rotates, as shown in FIGS. 3, 5 and 6, by a predetermined amount from the sunk position towards the clockwise direction so as to project sideways from the base plate (22) to thereby be brought into abutment with the half-opening striker (33). The half-opening stopper member (29) is prevented from rotating forwards (the clockwise direction in FIGS. 3, 5 and 6) by being brought into abutment with a stopper portion (22a) provided on the base plate (22) when at the projecting position.

The pawl member (31) is biased in an engaging direction (a clockwise direction) by a spring (not shown) and is able to rotate between an engaging position where the pawl member (31) is, as shown in FIGS. 3, 5, brought into engagement with a step portion (29a) provided on an outer circumference of the half-opening stopper member (29) so as to hold the half-opening stopper member (29) at the projecting position and a disengaging position where the pawl member (31) rotates, as shown in FIG. 6, by a predetermined amount from the engaging position towards a counterclockwise direction so as be disengaged from the step portion (29a). When the pawl member (31) rotates to the disengaging position, the half-opening stopper member (29) rotates to the sunk position by virtue of the biasing force of the spring (32).

With the half-opening stopper member (29) held at the projecting position, when the sliding door (1) is opened to the half-opened position, a rear edge of the half-opening stopper member (29) is, as shown in FIG. 5, brought into abutment with the half-opening striker (33), whereby the gliding door (1) is stopped at the half-opened position. In addition, with the half-opening stopper member (29) held at the sunk position by virtue of the biasing force of the spring (32), since the half-opening stopper member (29) is unable to be brought into abutment with the half-opening striker (33), the sliding door (1) can freely be opened and closed.

Note that when the sliding door (1) is stopped at the half-opened position, an opening front edge (12a) of the window opening (12) lies further forwards by a predetermined distance than the opening rear edge (7a) of the door opening (7). Consequently, when the window glass (11) is opened, an object is trapped between the opening front edge (12a) of the window opening (12) and the rear edge (7a) of the door opening (7) in no case by stopping the sliding door (1) at the half-opened position.

An intermediate lever (34) is pivotally secured to the base plate (22) by a pivot shaft (35) which extends vertically between the pawl member (26) of the full-opening latch unit (18) and the pawl member (31) of the half-opening stopping unit (19). The intermediate lever (34) rotates in the clockwise direction by a predetermined amount, as shown in FIG. 6 when the pawl member (26) rotates from the engaging position to the disengaging position, whereby the pawl member (31) is caused to rotate from the engaging position to the disengaging position, and the pawl member (31) is caused to rotate from the engaging position to the disengaging position by virtue of the rotation of the intermediate lever (34). This allows the pawl member (31) of the half-opening stopping unit (19) to move to the disengaging position in synchronism with the unfastening of the latch of the full-opening latch unit (18) (the movement of the pawl member (26) to the disengaging position).

The electric actuator (21), which makes up the drive unit, has a motor (36) (refer to FIG. 8) which is accommodated in a housing (21a) and is able to rotate forwards and backwards, a primary output lever (37) which is able to rotate via a reduction gear by virtue of the rotation of the motor (36), a secondary output lever (38) connected to the link lever (27) of the full-opening latch unit (18) and the full-closing latch unit (16) via cables (40) and (42), respectively, and a tertiary output lever (39) connected to the half-opening stopper member (29) of the half-opening stopping unit (19) via a cable (41).

The primary output lever (37) is normally biased to a neutral position shown in FIG. 3 by means of a spring (not shown) which is incorporated in the reduction gear, and when the motor (36) stops rotating after the primary output lever (37) rotates in the clockwise direction from the neutral position due to the motor (36) rotating forwards or rotates in the counterclockwise direction from the neutral position due to the motor (36) rotating reversely or backwards, the primary output lever (37) is made to be restored to the neutral position by virtue of the biasing force of the spring.

The secondary output lever (38) rotates in a direction indicated by an arrow A (first direction) in FIG. 3 in synchronism with the rotation of the output lever (37) in the counterclockwise direction, and the rotation of the secondary output lever (38) causes the link lever (27) to rotate from the waiting position to the operable position via the cable (41) and unfastens the latch of the full-closing latch unit (16) via the cable (42).

When the link lever (2) rotates to the operable position, as has been described above, the pawl member (26) of the full-opening latch unit (16) and the pawl member (31) of the half-opening stopping unit (19) rotate in the releasing directions. When the pawl member (31) rotates in the releasing direction, the half-opening stopper member (29) is caused to rotate to the sunk position by virtue of the biasing force of the spring (32) when the half-opening stopper member (29) is at the projecting position.

The tertiary output lever (39) rotates in a direction indicated by an arrow B (second direction) in FIG. 3 as the output lever (37) rotates in the clockwise direction, and this rotation of the tertiary output lever (39) causes the half-opening stopper member (29) to rotate via the cable (41) from the sunk position to the projecting position against the biasing force of the spring (32).

When the half-opening stopper member (29) rotates to the projecting position, the pawl member (31) is brought into engagement with the step portion (29a), whereby the half-opening stopper unit (29) is held at the projecting position.

FIG. 8 shows a block diagram of a control circuit. The window glass detecting sensor (14), a door position detecting sensor (43), which will be described later on, and the door opening and closing control switch (44) which is provided near the driver's seat or at any other location are electrically connected to input ports of a control circuit unit (45) which constitutes a control unit made up of a microcomputer, and the motor (61) and the electromagnetic clutch (62) of the door opening and closing drive unit (6), the motor (36) of the electric actuator (21) and the window opening and closing unit (13) are electrically connected to output ports of the control circuit unit (45).

Note that the window opening and closing unit (13) provided on the side of the sliding door (1), the motor (36) of the electric actuator (21) and the window glass detecting sensor (14) are normally electrically connected to a power supply (not shown) and the control circuit unit (45) which are provided on the side of the vehicle body (2) by an electric cable (not shown) provided to extend between the sliding door (1) and the vehicle body (2) in such a manner as to he extended and contracted therebetween.

The door position detecting sensor (43) is made up a rotary encoder (not shown) which detects the rotation of the rotary drum (63) which normally rotates in synchronism with the opening and closing movements of the sliding door (1) and sends out a pulse signal, which is a detection signal, to the control circuit unit (45) by detecting the rotation of the rotary drum (63). The control circuit unit (45) counts pulse signals sent out from the door position detecting sensor (43) and measures the position and traveling direction of the sliding door (1) at the time of reception of the signals.

The door opening and closing control switch (44) sends out to the control circuit unit (45) a sliding door opening operation signal when operated to open the sliding door (1) and a sliding door closing operation signal when operated to close the sliding door (1). The control circuit unit (45) controls such that the electromagnetic clutch (62) of the door opening and closing drive unit (6) is engaged and the motor (61) operates in a door opening direction based on the input thereinto of the sliding door opening operation signal and controls such that the electromagnetic clutch (62) is engaged and the motor (61) operates in a door closing direction based on the input thereinto of the sliding door closing operation signal.

When a window glass opened signal is inputted thereinto from the window glass detecting sensor (14), the control circuit unit (45) controls such that the motor (36) of the electric actuator (21) rotates reversely, whereby the tertiary output lever (39) rotates in the direction indicated by the arrow B to thereby cause the half-opening stopper member (29) to rotate from the sunk position to the projecting position via the cable (41). In addition, when a window glass closed signal is inputted thereinto from the window glass detecting sensor (14), the control circuit unit (45) controls such that the motor (36) rotates forwards, whereby the secondary output lever (38) rotates in the direction indicated by the arrow A to thereby causes the pawl member (31) of the half-opening unit (19) to rotate to the disengaging position via the cable (40), the link lever (27), the pawl member (26) and the intermediate lever (34) so as to enable the half-opening stopper member (29) to move from the projecting position to the sunk position.

Next, the function according to the embodiment of the invention will be described below.

(A) (When the sliding door (1) is held at the fully-closed position and the window glass (11) is closed)

In this state, the fall-closing latch unit (16) is in engagement with the striker, and as show in FIG. 4, the latch (24) of the full-opening latch unit (18) is held at the releasing position, and the half-opening stopper member (29) of the half-opening stopping unit (19) is held at the sunk position, respectively. Consequently, after the engagement of the full-closing latch unit (16) is released by operating the door opening and closing control switch (44) or the operating handle (20) so as to open the sliding door (1), the sliding door (1) can be caused to move pass the half-opened position to thereby reach the fully-opened position through the operation of the door opening and closing drive unit (6) or manually.

(B) (When the sliding door (1) is held at the fully-closed position and the window glass (11) is opened)

When the window glass detecting switch (14) detects that the window glass (11) has been opened, the control circuit unit (45) controls such that the motor (36) of the electric actuator (21) rotates reversely, whereby the tertiary output lever (39) rotates in the direction indicated by the arrow B, causing the half-opening stopper unit (29) to move from the sunk position to the projecting position against the biasing force of the spring (32).

When the half-opening stopper member (29) has rotated to the projecting position, the pawl member (31) is, as shown in FIG. 3, brought into engagement with the step portion (29a) of the half-opening stopper member (29) to thereby hold the half-opening stopper unit (29) at the projecting position. Consequently, even in the event that the sliding door (1) is attempted to be operated to open by operating the door opening and closing control switch (44) to open the sliding door (1) or manually in this state, the half-opening stopper unit (29) is, as shown in FIG. 5, brought into abutment with the half-opening striker (33) at the half-opened position, whereby the sliding door (1) is stopped at the half-opened position.

Incidentally, for example, when the vehicle is stopped in a posture which inclines downwards towards the front thereof, in the event that the sliding door (1) is stopped at the half-opened position, there may be caused a risk that the sliding door (1) abruptly closes by gravity. In order to prevent the abrupt closure of the sliding door (1), in the embodiment, when the control circuit unit (45) measures the movement of the sliding door (1) in the closing direction based on pulse signals outputted by the sliding door position detecting sensor (43) after the sliding door (1) has stopped at the half-opened position, the control circuit unit (45) controls such that the electromagnetic clutch (62) is engaged while the motor (61) of the door opening and closing unit (6) is kept stopped so as to cause a braking force to be exerted against the movement of the sliding door (1) to thereby hold the sliding door (1) at the half-opened position.

In addition, when the window glass (11) is closed after the sliding door (1) has stopped at the half-opened position, control circuit unit (45) controls based on a window glass closed signal from the window glass detecting sensor (14) such that the motor (36) of the electric actuator (21) rotates forwards, whereby the pawl member (31) of the half-opening stopping unit (19) moves, as shown in FIG. 6, to the releasing position via the cable (40), the link lever (27), the pawl member (26) of the full-opening latch unit (18) and the intermediate lever (34) as the secondary output lever (38) rotates in the direction indicated by the arrow A, this causing the half-opening stopper member (29) to move, as shown in FIG. 4, to the sunk position against the biasing force of the spring (32) to thereby be held thereat. As a result, the sliding door (1) is allowed to move to the opening direction after passing the half-opened position.

(C) (When the sliding door (1) is held at the fully-opened position and the window glass is in the closed state)

In this state, the latch (24) of the full-opening latch unit (18) is, as shown in FIG. 7, in engagement with the full-opening striker (17) and the pawl member (26) is in engagement with the step portion (24a) of the latch (24). In addition, the half-opening stopper member (29) of the half-opening stopping unit (19) is held at the sunk position by the spring (32).

When the door opening and closing control switch (44) is operated to close the sliding door (1) in this state, the motor (36) of the electric actuator (21) rotates forwards, whereby the sliding door (1) can be caused to move in the closing direction through the operation of the door opening and closing drive unit (6) after the pawl member (26) of the full-opening latch unit (18) is caused to move in the releasing direction.

In addition, when the sliding door (1) lies at the fully-opened position (and between the fully-opened position and the half-opened position), even in the event that the window glass detecting sensor (14) detects that the window glass (11) is opened, the control circuit unit (45) nullifies a window glass opened signal from the glass window detecting sensor (14). consequently, the half-opening stopper member (29) moves to the projecting position in no case while being kept held at the sunk position, whereby since the half-opening stopper member (29) collies against the half-opening striker (33) front the rear thereof in no case, when the sliding door (1) is operated to close, the sliding door (1) can be caused to move freely towards the fully-closed position after passing the half-opened position In addition, since the fully-opened position (and the position between the fully-opened position and the half-opened position) is a position where there exists no risk that an object is trapped therein, there is no need to cause the half-opening stopper member (29) to move to the projecting position. Consequently, as has been described above, it is possible to eliminate useless movements of the half-opening stopper member (29).

Note that while the embodiment of the invention has been described heretofore, it is possible to make various types of modifications and changes without departing from the spirit and scope of the invention. For example, the following various types of modifications and changes to the embodiments can be made.

(i) Instead of being connected to the pawl member (26) of the full-opening latch unit (18), the secondary output lever (38) of the electric actuator (21) is connected to the pawl member (31) of the half-opening stopping unit (19). In this case, the latch of the full-opening latch unit (18) is unfastened in synchronism with the movement of the pawl member (31) to the releasing position.

(ii) The intermediate lever (34) is abandoned.

(iii) The configuration of the electric actuator (21) is changed as appropriately.

(iv) The electric actuator (21) is connected to the full-opening latch unit (18) and the half-opening stopping unit (19) via a distributing unit (46) (refer to FIG. 2) which is made up of a plurality of levers and which can distribute the operating force of the electric actuator (21) to the respective units.

(v) In addition to the full-closing latch unit (16) and the full-opening latch unit (18), a front full-closing latch unit (not shown) provided on a front side of the sliding door (1) is connected to the secondary output lever (38).

(vi) In place of or in addition to the door opening and closing control switch (44), the door opening and closing control unit is made up of a sensor which can detect the operation of the operating handle (20). In this case, when the operating handle (20) is operated, the electric actuator (21) is actuated.

(vii) The invention is applied to a vehicle sliding door opening and closing apparatus which does not include the door opening and closing drive unit (6). In this case, only the electric actuator (21) is actuated based on control of the door opening and closing control unit, and the sliding door (1) is opened and closed manually.

What is claimed is:

1. A vehicle sliding door opening and closing apparatus comprising:
    a full-opening latch unit adapted to be brought into engagement with a full-opening striker provided on a side of a vehicle body so as to hold a sliding door at a fully-opened position;
    a first drive unit adapted to operate in a first direction based on operation of a door opening and closing control unit which enables an opening and closing of the sliding door so as to unfasten a latch of the full-opening latch unit;
    a half-opening stopping unit adapted to be displaced from a state where the half-opening stopping unit is unable to be brought into abutment with a half-opening striker provided on the side of the vehicle body to a state where the half-opening stopping unit is able to be brought into abutment with the half-opening striker when a window glass provided in the sliding door in such a manner as to be opened and closed is opened, wherein the half-opening stopping unit is brought into abutment with the half-opening striker when the sliding door is opened to a predetermined half-opened position to stop the sliding door at the half-opened position;
    a window glass detecting switch adapted to detect an opening and closing of the window glass; and
    a first control unit adapted to control the first drive unit so as to operate in a second direction when the window glass detecting switch detects that the window glass has been opened,
    wherein the first drive unit is linked to the half-opening stopping unit such that the half-opening stopping unit can be displaced to the state where the half-opening stopping unit is brought into abutment with the half-opening striker when the first drive unit is operated in the second direction.

2. The vehicle sliding door opening and closing apparatus according to claim 1, further comprising a door opening and closing drive unit adapted to operate based on operation of the door opening and closing control unit so as to move the sliding door to be opened and closed.

3. The vehicle sliding door opening and closing apparatus according to claim 1, wherein the half-opening stopping unit comprises:
    a half-opening stopper member which can move between a sunk position where the half-opening stopping unit is unable to be brought into abutment with the half-opening striker and a projecting position where the half-opening stopping unit is able to be brought into abutment with the half-opening striker;

a pawl member which holds the half-opening stopper member at the projecting position by being brought into engagement with the half-opening stopper member and enables the half-opening stopper member to move to the sunk position by being disengaged therefrom; and a spring which biases the half-opening stopper member to the sunk position.

4. The vehicle sliding door opening and closing apparatus according to claim 3, wherein the half-opening stopper member moves from the sunk position to the projecting position against a biasing force of the spring when the first drive unit operates in the second direction.

5. The vehicle sliding door opening and closing apparatus according to claim 3, wherein the pawl member of the half-opening stopping unit disengages from the half-opening stopper member in synchronism with an unfastening of the latch of the full-opening latch unit which occurs when the first drive unit operates in the first direction.

6. The vehicle sliding door opening and closing apparatus according to claim 1, wherein the first control unit is able to measure the position of the sliding door based on the movement of the sliding door, and wherein, when measuring a fully-closed position of the sliding door and a position between the fully-closed position and the half-opened position thereof, the first control unit controls the first drive unit such that the first drive unit operates in the first direction when the window glass detecting switch detects that the window glass has been closed.

7. The vehicle sliding door opening and closing apparatus according to claim 1, wherein, when measuring the fully-opened position of the sliding door and a position between the fully-opened position and the half-opened position thereof, the first control unit controls the first drive unit such that the first drive unit is inoperative when the window glass detecting switch detects that the window glass has been opened.

8. The vehicle sliding door opening and closing apparatus according to claim 2, wherein the door opening and closing drive unit comprises:

a motor which is able to operate based on control of the door opening and closing control unit; and an electromagnetic clutch which is able to connect and disconnect an operation force transmission path which connects the motor and the sliding door together.

9. The vehicle sliding door opening and closing apparatus according to claim 8, wherein the first control unit controls the electromagnetic clutch such that the electromagnetic clutch is put in a connecting state so as to impart a braking force to the sliding door when the first control unit measures the movement of the sliding door in a closing direction immediately after the sliding door has stopped at the half-opened position.

10. The vehicle sliding door opening and closing apparatus according to claim 1, wherein the sliding door is supported in such a manner as to be opened and closed along the vehicle body.

11. A vehicle sliding door opening and closing apparatus comprising:

a full-opening latch unit adapted to be brought into engagement with a full-opening striker provided on a side of a vehicle body so as to hold a sliding door at a fully-opened position;

a drive unit adapted to operate in a first direction based on operation of a first control unit which enables an opening and closing of the sliding door so as to unfasten a latch of the full-opening latch unit;

a half-opening stopping unit adapted to be displaced from a state where the half-opening stopping unit is unable to be brought into abutment with a half-opening striker provided on the side of the vehicle body to a state where the half-opening stopping unit is able to be brought into abutment with the half-opening striker when a window glass provided in the sliding door is opened; and a second control unit adapted to control the drive unit so as to operate in a second direction when the window glass has been opened, wherein the drive unit is linked to the half-opening stopping unit such that the half-opening stopping unit can be displaced to the state where the half-opening stopping unit is brought into abutment with the half-opening striker when the drive unit is operated in the second direction.

12. The vehicle sliding door opening and closing apparatus according to claim 11, wherein the half-opening stopping unit comprises:

a half-opening stopper member which can move between a sunk position where the half-opening stopping unit is unable to be brought into abutment with the half-opening striker and a projecting position where the half-opening stopping unit is able to be brought into abutment with the half-opening striker;

a pawl member which holds the half-opening stopper member at the projecting position by being brought into engagement with the half-opening stopper member and enables the half-opening stopper member to move to the sunk position by being disengaged therefrom; and a spring which biases the half-opening stopper member to the sunk position.

13. The vehicle sliding door opening and closing apparatus according to claim 12, wherein the half-opening stopper member moves from the sunk position to the projecting position against a biasing force of the spring when the drive unit operates in the second direction.

14. The vehicle sliding door opening and closing apparatus according to claim 12, wherein the pawl member of the half-opening stopping unit disengages from the half-opening stopper member in synchronism with an unfastening of the latch of the full-opening latch unit which occurs when the drive unit operates in the first direction.

15. The vehicle sliding door opening and closing apparatus according to claim 11, wherein the second control unit is able to measure the position of the sliding door based on the movement of the sliding door and, wherein, when measuring a fully-closed position of the sliding door and a position between the fully-closed position and a half-opened position thereof, the second control unit controls the drive unit such that the drive unit operates in the first direction when the window glass has been closed.

16. The vehicle sliding door opening and closing apparatus according to claim 11, wherein, when measuring the fully-opened position of the sliding door and a position between the fully-opened position and a half-opened position thereof, the second control unit controls the drive unit such that the drive unit is inoperative when the window glass has been opened.

17. The vehicle sliding door opening and closing apparatus according to claim 11, wherein the sliding door is supported in such a manner as to be opened and closed along the vehicle body.

* * * * *